United States Patent Office 3,277,213
Patented Oct. 4, 1966

3,277,213
POLYHYDROXY-POLYOXYALKYLENE ETHERS DERIVED FROM STARCH AND PROCESS FOR PREPARING SAME
Stephen Fuzesi, Hamden, Conn., assignor to Olin Mathieson Chemical Corporation, a corporation of Virginia
No Drawing. Filed June 27, 1962, Ser. No. 205,557
18 Claims. (Cl. 260—233.3)

The present invention relates to novel polyhydroxy-polyoxyalkylene ethers prepared by the copolymerization of starch and to the process for the preparation of these novel compounds.

Polyhydroxy-polyoxyalkylene ethers are useful in a wide variety of commercial applications, especially in the preparation of polyurethane foams. It is highly desirable to prepare these useful polymers directly from the readily available and inexpensive compounds known generically as starches.

Heretofore, starches have been converted to glucosides and the glucosides may be alkoxylated. However, this is a long and involved process, with the procedure of the glucoside formation being extremely complex leading to a diversity of products many of which are not reactable with alkylene oxides. In addition, in most cases different catalysts are used for the glucoside preparation and for the glucoside alkoxylation. Attempts to circumvent this complex procedure and proceed directly from the starch have thus far been unsuccessful.

Accordingly, it is the principal object of the present invention to provide a process for the preparation of novel polyhydroxy-polyoxyalkylene ethers directly from starch.

It is a further object of the present invention to provide a process as aforesaid which is easy to operate, operates at reasonably low temperatures and short reaction times, and obtains good yields of light colored, low viscosity products capable of a wide variety of uses.

It is a still further object of the present invention to provide a process as aforesaid which yields novel polyhydroxy-polyoxyalkylene ethers capable of preparing polyurethane foams having excellent physical properties.

Further objects and advantages of the present invention will appear hereinafter.

In accordance with the process of the present invention it has been found that the foregoing objects and advantages of the present invention may be accomplished and novel polyhydroxy-polyoxyalkylene ethers may be prepared by: admixing, in the presence of at least 0.5 percent of a Lewis acid catalyst, one glucose unit weight of starch and at least 0.5 mole of a polyhydric alcohol containing at least 2 hydroxyl groups; maintaining the mixture at an elevated temperature; and introducing into said mixture a compound containing a 1,2-oxide.

It has been found, surprisingly and unexpectedly, that when the foregoing process is performed all of the objects of the present invention are accomplished and novel polyhydroxy-polyoxyalkylene ethers of low viscosity and excellent physical properties are obtained.

It is an additional surprising feature of the present inveniton that a Lewis acid catalyst operates efficaciously in the process of the present invention since when 1,2-oxides are reacted with polyols the reaction usually is conducted in the presence of an alkaline catalyst, such as potassium hydroxide.

The products of the present invention may be readily cross-linked with diisocyanates to form polyurethane foams having excellent physical properties. In addition, the products of the present invention have a wide variety of other uses, such as coatings, elastomers, etc.

In the process of the present invention any polyhydric alcohol containing at least 2 hydroxyl groups may be employed with the preferred polyhydric alcohols being glycerol, ethylene glycol, propylene glycol, and sorbitol due to availability and ease of reaction. Other polyhydric alcohols which may be conveniently employed include, but are not limited to, pentaerythritol, hexanetriol, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, etc. The polyol component is normally employed in an amount of at least 0.5 mole of polyol per one glucose unit weight of starch. The upper limit of polyol is not critical; however, it is preferred to use from 0.5 to 10 moles of polyol per one glucose unit weight of starch in order to retain as much as possible of the starch characteristic in the product. It was calculated that 162 grams of starch is one glucose unit weight of starch. Normally, each glucose unit weight of starch contains water associated therewith. In the preferred embodiment of the present invention a small amount of water, preferably at least one mole or 18 grams is employed. The upper amount of water is not critical.

In the process of the present invention, any starch may be employed, i.e., any compound having a formula $(C_6H_{10}O_5)_x$. These compounds are carbohydrates or polysaccharides which occur naturally in many plant cells. Typical starches which may be conveniently employed include, potato starch, chlorinated starches, corn starch, rice starch, tapioca starch, wheat starch, etc. Potato starch is preferred, however, due to price and ease of reaction.

In the process of the present invention a Lewis acid catalyst is employed in an amount of at least 0.5 percent by weight of the starch and polyol component and preferably from about 0.5 to 4 percent by weight. The upper limit of the amount of Lewis acid catalyst is not critical and may be varied within a wide range. The preferred Lewis acid is boron trifluoride. Other representative Lewis acid catalysts include, but are not limited to, boron trichloride, aluminum chloride, titanium chloride, tin tetrachloride, ferric chloride and acidic clays, such as Tonsil clay. The term "Lewis acid" as used throughout the description and claims is intended to include only aprotic acids in accordance with common usage and does not include proton donor acids such as sulfuric acid, hydrochloric acid, phosphoric acid and the like, which are sometimes included in the broad definition of the term.

Any compound containing a 1,2-oxide may be conveniently employed in the process of the present invention Typical of such compounds are the alkylene oxides, especially lower alkylene oxides (which are preferred), aryl alkyl oxides and cycloalkylene oxides, etc. Specific substituents include, but are not limited to, ethylene oxide, propylene oxide, butylene oxide, glycidol, isobutylene oxide, tetramethylene oxide, n-hexyl oxide, epihalohydrin, cyclobutylene oxide, cyclohexylene oxide, etc. The amount of 1,2-oxide reacted is not critical. Generally, there is employed at least one mole of 1,2-oxide per glucose unit weight of starch. When the product is utilized in the preparation of polyurethane foams, sufficient 1,2- oxide should be employed so that the product has a hydroxyl number in the range of about 30 to 800.

The reaction with the 1,2-oxide is accelerated by employing elevated temperatures, i.e., preferably from 30 to 250° C. The specific temperature of the reaction will naturally vary depending on the degree of completion, reactants employed and other reaction conditions, such as time of reaction. Similarly, the reaction time will naturally vary depending upon the temperature of the reaction, reactants employed and amounts thereof.

In the reaction with the 1,2-oxide the condensed water produced during the reaction of starch is removed or alternatively, the reaction may be conducted without separating the condensed water. When the water is not removed the water itself will be propoxylated and will produce a polypropoxylated diol as a constituent in the starch and polyol.

In the process of the present invention the 1,2-oxide is introduced into a reaction mixture, maintained at the desired temperature, containing starch, polyol and catalyst. In the preferred operation the starch component is slowly added to a hot, fluid reaction mixture, preferably maintained at from 100 to 250° C. and containing the polyol and catalyst component. After the starch component is added the reaction mixture may, if desired, be maintained at this elevated temperature for at least 5 minutes and generally for not over one hour, after which time the 1,2-oxide component is introduced while maintaining the mixture at from 30 to 250° C. The 1,2-oxide addition period generally depends upon the amount of 1,2-oxide used. The lower temperatures are preferably employed during the reaction with the 1,2-oxide since this latter step is exothermic.

The process of the present invention will be more readily apparent from a consideration of the following illustrative examples. In the following examples the starch which was employed contained associated therewith about 15 percent by weight of water.

*Example 1*

One mole (192 grams) of sorbitol was charged into a three liter, three necked reaction vessel. Heat was then applied to the reactor, and, with gentle agitation, the mixture was heated until all of the sorbitol was melted. Three cubic centimeters of boron trifluoride diethyl ether complex were then added slowly to the hot liquid. The temperature was brought to 130 to 140° C. and 180 grams of potato starch were added into the hot reaction mixture keeping the temperature between 125 to 135° C. After all of the starch was added, the addition of propylene oxide was started. During the addition of the first portion of the propylene oxide the temperature was gradually decreased to 70 to 90° C. The temperature was maintained in this range and 850 grams of propylene oxide were added. The reaction was exothermic. After the addition of propylene oxide, the reaction mixture was neutralized using a sodium bicarbonate-water mixture. After purification the product was a viscous, yellow colored liquid having the following analysis:

Hydroxyl No. mg. KOH/g. _____ 516
Acid No. mg. KOH/g. _____ 0.3
pH _____ 7.7
H₂O percent _____ 0.04

*Example 2*

Into a three liter, three-necked reaction vessel 92 grams (1.0 mole) of glycerol and three cc. of boron trifluoride diethyl ether complex were charged. Heat was then applied to the reactor and the temperature gradually brought to 120 to 140° C. Then, 180 grams of potato starch were slowly added into the hot reaction mixture. After all of the starch was added, the temperature was kept at 130 to 140° C. while maintaining gentle stirring and water was condensed. During 45 minutes 12 to 14 cc. of excess water was separated. Then, the addition of propylene oxide was started. During the addition of the first part of the propylene oxide, the temperature was gradually decreased to 50 to 80° C. The temperature was maintained in this range and 650 grams of propylene oxide were added. The reaction was exothermic. After addition of propylene oxide, the reaction mixture was neutralized with 15 grams of basic Attapulgus clay in water. The product was a viscous, light yellow colored liquid having the following analysis:

Hydroxyl No. mg. KOH/g. _____ 438
Acid No. mg. KOH/g. _____ 0.08
pH _____ 4.55
H₂O percent _____ 0.05

*Example 3*

Into a three liter, three-necked reaction vessel 62 grams (1.0 mole) of ethylene glycol and 3 cc. of boron trifluoride diethyl ether complex were introduced. Heat was then applied to the reactor and the temperature gradually brought to 130 to 150° C. Then 180 grams of potato starch were slowly added into the hot mixture. Keeping the temperature at 130 to 140° C., water was condensed. Without separation of the water, the addition of propylene oxide was started. During addition of the first part of the propylene oxide the temperature was gradually decreased to 60 to 90° C. The temperature was maintained in this range and 850 grams of propylene oxide were added. The reaction was exothermic. The reaction mixture was neutralized with a sodium carbonate-water mixture. After purification the product was a viscous, yellow colored liquid having the following analysis:

Hydroxyl No. mg. KOH/g. _____ 414
Alkali No. mg. KOH/g. _____ 0.66
pH _____ 10.4
H₂O percent _____ 0.07

*Example 4*

Into a three liter, three necked reaction vessel, 77 grams (1.0 mole) of propylene glycol and 4 cc. of boron trifluoride diethyl ether complex were charged. Heat was then applied to the reactor and the temperature gradually brought to 130 to 150° C. Then, 180 grams of potato starch were slowly added into the hot mixture. Keeping the temperature at 130 to 140° C., 13 to 14 cc. of excess water were separated as a reaction by-product. Then, propylene oxide was added. During the addition of the first part of the propylene oxide the temperature was gradually decreased to 60 to 90° C. The temperature was maintained in this range and 600 grams of propylene oxide were added. The reaction was exothermic. The reaction mixture was neutralized with 20 grams basic Attapulgus clay in water. After purification, the product was a viscous, yellow colored liquid, having the following analysis:

Hydroxyl No. mg. KOH/g. _____ 508
Acid No. mg. KOH/g. _____ 0.2
pH _____ 4.3
H₂O percent _____ 0.1

*Example 5*

Into a three liter, three necked reaction vessel 92 grams (1.0 mole) of glycerol and 3 cc. of boron trifluoride diethyl etherate were charged. Heat was then applied to the reactor, and the temperature gradually brought to 120 to 150° C. Then, 180 grams of potato starch were slowly added into the hot mixture and without the separation of the condensed water, epichlorohydrin was slowly added. During the addition of the first part of the epichlorohydrin the temperature was gradually decreased to 100 to 120° C. The temperature was maintained in this range and 850 grams of epichlorohydrin was added. The reaction was exothermic. After addition of epichlorohydrin, the reaction mixture was neutralized using a sodium bicarbonate-water mixture. After purification, the product was a viscous, light brown colored liquid having the following analysis:

Hydroxyl No. mg. KOH/g. _____ 294
Acid No. mg. KOH/g. _____ 0.13
pH _____ 7.6
H₂O percent _____ 0.18

*Example 6*

To 100 grams of the product of Example 2 were added 25 grams of trifluorochloromethane and the mixture was stirred until homogenous. When the mixture became homogenous, 1.5 grams of silicone oil and 0.75 gram of dibutyltin dilaurate and 0.62 gram of dimethylethanolamine were added and the mixture stirred until homogenous. When the mixture became homogenous, 88 grams of crude tolylene diisocyanate were added, a mixture of about 80 percent 2,4-tolylene diisocyanate and 20 percent 2,6-tolylene diisocyanate. The resultant mixture was stirred for about 20 seconds, poured into a mold and allowed to cure at room temperature to a rigid polyurethane foam having a fine cell structure, and a density of 2.3 pounds per cubic foot. The foam had a compressive strength of 36 p.s.i. at room temperature.

*Example 7*

A rigid polyurethane foam was prepared in a manner after Example 6 from the following ingredients:

100 grams of the product of Example 4
25 grams of trifluorochloromethane
1.5 grams of silicone oil
0.75 gram of dibutyltin dilaurate
0.62 gram of dimethylethanolamine
100.00 grams of a mixture of isomers of tolylene diisocyanate.

The resultant rigid polyurethane foam had a fine cell structure, a density of 2.50 pounds per cubic foot and a compressive strength of 41.2 p.s.i. at room temperature.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the preparation of a polyhydroxy-polyoxyalkylene ether which comprises reacting starch with an alcohol containing at least two hydroxyl groups in the presence of a Lewis acid catalyst at an elevated temperature, the proportion of said alcohol being at least 0.5 mole of alcohol per glucose unit weight of starch, the proportion of Lewis acid catalyst being at least 0.5 percent of the total weight of starch and alcohol, and reacting the resulting reaction mixture with a 1,2-oxide selected from the group consisting of alkylene oxides, glycidol, epihalohydrins, and cycloalkylene oxides, in the presence of an aprotic Lewis acid catalyst.

2. A process for the preparation of a polyhydroxy-polyoxyalkylene ether which comprises reacting starch with an alcohol containing at least two hydroxyl groups in the presence of a Lewis acid catalyst and water at a temperature in the range between 30 and 250° C., the proportion of said alcohol being between about 0.5 and 10 moles of alcohol per glucose unit weight of starch, the proportion of Lewis acid catalyst being at least 0.5 percent of the total weight of starch and alcohol, the proportion of water being at least one mole of water per glucose unit weight of starch, and reacting the resulting reaction mixture with a 1,2-oxide selected from the group consisting of alkylene oxides, glycidol, epihalohydrins, and cycloalkylene oxides, in the presence of an aprotic Lewis acid catalyst, the proportion of 1,2-oxide being equivalent to at least one mole per glucose unit weight of starch initially reacted with said alcohol.

3. A process according to claim 2 wherein said 1,2-oxide is an alkylene oxide.

4. A process according to claim 3 wherein said starch is potato starch.

5. A process according to claim 3 wherein said alcohol is glycerol.

6. A process according to claim 3 wherein said alcohol is ethylene glycol.

7. A process according to claim 3 wherein said alcohol is propylene glycol.

8. A process according to claim 3 wherein said alcohol is sorbitol.

9. A process for the preparation of a polyhydroxy-polyoxyalkylene ether which comprises reacting starch with an alcohol containing at least two hydroxyl groups in the presence of a Lewis acid catalyst and water at a temperature between about 100 and 200° C. for from 5 to 60 minutes, the proportion of said alcohol being between 0.5 and 10 moles of alcohol per glucose unit weight of starch, the proportion of Lewis acid catalyst being between about 0.5 and 4 percent by weight of the total weight of starch and alcohol, the proportion of water being at least one mole per glucose unit weight of starch, and reacting the resulting reaction mixture with a 1,2-oxide selected from the group consisting of alkylene oxides, glycidol, epihalohydrins, and cycloalkylene oxides, in the presence of an aprotic Lewis acid catalyst while maintaining the temperature in the range between 30 and 250° C.

10. The process of claim 9 wherein water is separated from said reaction mixture prior to reaction with said 1,2-oxide.

11. A process for the preparation of a polyhydroxy-polyoxyalkylene ether which comprises reacting starch with an alcohol containing at least two hydroxyl groups in the presence of a Lewis acid catalyst at a temperature between about 100 and 200° C. for between 5 and 60 minutes, the proportion of said alcohol being between 0.5 and 10 moles of alcohol per glucose unit weight of starch, the proportion of Lewis acid catalyst being between about 0.5 and 4 percent of the total weight of starch and alcohol, separating water of condensation as it forms, and reacting the resulting reaction mixture with a 1,2-oxide selected from the group consisting of alkylene oxides, glycidol, epihalohydrins, and cycloalkylene oxides, in the presence of an aprotic Lewis acid catalyst while maintaining the temperature in the range between 30 and 250° C.

12. The polyhydroxy-polyoxyalkylene ether prepared by reacting starch with an alcohol containing at least two hydroxyl groups in the presence of a Lewis acid catalyst at a temperature between about 30 and 250° C. for between 5 and 60 minutes, the proportion of said alcohol being between 0.5 and 10 moles of alcohol per glucose unit weight of starch, the proportion of Lewis acid catalyst being between about 0.5 and 4 percent of the total weight of starch and alcohol and reacting the resulting reaction mixture with a 1,2-oxide selected from the group consisting of alkylene oxides, glycidol, epihalohydrins, and cycloalkylene oxides, in the presence of an aprotic Lewis acid catalyst while maintaining the temperature in the range between 30 and 250° C., the proportion of 1,2-oxide being equivalent to at least one mole per glucose unit weight of starch initially reacted with said alcohol.

13. A composition according to claim 12 wherein said 1,2-oxide is an alkylene oxide.

14. A composition according to claim 13 wherein said starch is potato starch.

15. A composition according to claim 13 wherein said polyhydric alcohol is glycerol.

16. A composition according to claim 13 wherein said polyhydric alcohol is ethylene glycol.

17. A composition according to claim 13 wherein said polyhydric alcohol is propylene glycol.

18. A composition according to claim 13 wherein said polyhydric alcohol is sorbitol.

References Cited by the Examiner

UNITED STATES PATENTS

| | | | |
|---|---|---|---|
| 2,516,633 | 7/1950 | Kesler et al. | 260—233.3 |
| 2,962,524 | 11/1960 | Hostettler et al. | 260—233.3 |
| 3,165,508 | 1/1965 | Otey et al. | 260—233.3 |

OTHER REFERENCES

Lee et al.: Epoxy Resins, McGraw Hill, N.Y. (1957), page 11.

DONALD E. CZAJA, *Primary Examiner.*

JAMES A. SEIDLECK, LEON J. BERCOVITZ, *Examiners.*

J. M. DULIN, R. W. MULCAHY, *Assistant Examiners.*